: US 7,650,781 B2
(45) Date of Patent: Jan. 26, 2010

(12) United States Patent
Keski-Hynnila et al.

(10) Patent No.

(54) METHOD FOR VERIFYING THE FUNCTIONALITY OF THE COMPONENTS OF A DIESEL PARTICULATE FILTER SYSTEM

(75) Inventors: Donald E. Keski-Hynnila, Canton, MI (US); Jeffery S. Hawkins, Farmington Hills, MI (US); Harald Wedler, Neuhausen (DE); Reinhard Pfundt, Ansbach (DE); Frank S. Groer, West Bloomfield, MI (US); Mark A. Zurawski, Northville, MI (US); Amr M. Radwan, Canton, MI (US); Peter Zagone, Huntington, MI (US); Kevin D. Sisken, Saline, MI (US); Matthew T. Baird, Canton, MI (US); Min Sun, Troy, MI (US); Zornitza P. Pavlova-MacKinnon, Farmington Hills, MI (US); Dennis J. Grace, West Bloomfield, MI (US); Heather A. Staley, Garden City, MI (US)

(73) Assignee: Detroit Diesel Corporation, Detroit, MI (US)

( * ) Notice: Subject to any disclaimer, the term of this patent is extended or adjusted under 35 U.S.C. 154(b) by 47 days.

(21) Appl. No.: 11/959,838

(22) Filed: Dec. 19, 2007

(65) Prior Publication Data
US 2008/0156084 A1    Jul. 3, 2008

Related U.S. Application Data

(60) Provisional application No. 60/877,307, filed on Dec. 27, 2006.

(51) Int. Cl.
*G01M 15/10* (2006.01)
(52) U.S. Cl. .................................. 73/114.76; 73/114.75

(58) Field of Classification Search ............... 73/114.69, 73/114.71, 114.74, 114.75, 114.76, 114.77
See application file for complete search history.

(56) References Cited

U.S. PATENT DOCUMENTS

| | | | |
|---|---|---|---|
| 5,558,752 | A | 9/1996 | Wang et al. |
| 6,076,504 | A | 6/2000 | Stavnheim et al. |
| 6,317,681 | B2 | 11/2001 | Elliott et al. |
| 6,370,935 | B1 | 4/2002 | He et al. |
| 6,389,874 | B1 | 5/2002 | Huff et al. |
| 6,457,461 | B1 | 10/2002 | Romzek |
| 6,604,412 | B2 | 8/2003 | Jankovic et al. |
| 6,666,201 | B1 | 12/2003 | Mazur |
| 6,687,601 | B2 | 2/2004 | Bale et al. |
| 6,701,282 | B2 | 3/2004 | Ting et al. |
| 6,804,601 | B2 | 10/2004 | Wang et al. |
| 6,837,226 | B2 | 1/2005 | Wang et al. |
| 7,069,773 | B2 | 7/2006 | Stempnik et al. |
| 7,095,238 | B2 | 8/2006 | Steinruecken et al. |
| 7,127,347 | B2 | 10/2006 | Moser et al. |
| 7,201,048 | B2 | 4/2007 | Renninger et al. |
| 7,201,160 | B2 | 4/2007 | Yoshiume et al. |

(Continued)

*Primary Examiner*—Eric S McCall
(74) *Attorney, Agent, or Firm*—Bill C. Panagos; Rader, Fishman & Grauer, PLLC (57) ABSTRACT

A method for verifying the functionality of the components for a diesel particulate filter system based upon engine speed, engine torque, inlet and outlet exhaust pressure at the diesel particulate filter. Various sensor signals are compared to calibratable values in memory for a determination whether the diesel particulate filter system is functional.

21 Claims, 3 Drawing Sheets

U.S. PATENT DOCUMENTS

2003/0225507 A1    12/2003   Tamura
2008/0155970 A1*   7/2008    Keski-Hynnila et al. ...... 60/295
2009/0151330 A1*   6/2009    Chamarthi et al. ............ 60/286

* cited by examiner

METHOD FOR VERIFYING THE FUNCTIONALITY OF THE COMPONENTS OF A DIESEL PARTICULATE FILTER SYSTEM

CROSS-REFERENCE TO RELATED APPLICATIONS

The present application claims priority to U.S. Provisional Application Ser. No. 60/877,307 filed on Dec. 27, 2006, the contents of which are incorporated herein in their entirety.

BACKGROUND OF THE INVENTION

Industry and legislative initiatives have, in recent years, increasing focused on the need to reduce exhaust emissions from internal combustion engines. Industry efforts have led to the introduction of catalytic converters, particulate filters and other technologies to reduce emissions and increase fuel economy. There is a continuing advantage to keep those components in repair to ensure that the environmental goals of industry and legislatures are met during the operating life of a vehicle. Warranty issues are reduced when the vehicle is kept in repair, and environmental goals are addressed when the exhaust emissions are controlled.

The present invention relates to a method for verifying the functionality of the components of a diesel a particulate filter system.

The present invention further relates to a method to perform rationality checks on sensors in an exhaust system of a diesel engine, particularly the diesel particulate filter system, to determine whether the sensors are transmitting accurate sensor readings.

The present invention further relates to a method to perform rationality checks on the sensors in a diesel particulate filter system to determine whether they are transmitting accurate data signals and that the exhaust system is in compliance with emissions requirements. If the sensors are determined to be inaccurate, a fault is logged in the engine control unit and a warning indicator may be activated alerting the operator of the need to service the vehicle.

BRIEF SUMMARY OF THE INVENTION

The present invention is directed to a method to perform diagnostics on an electronically controlled diesel engine equipped with an electronic control unit (ECU) having memory and tables resident therein. The engine is further equipped with a diesel particulate filter system and at least one sensor adapted to transmit data signals from a diesel particulate filter system having a catalyst with an inlet and an outlet. The method comprises:

determining limits of a range of operation of sensor or component functionality;

determining engine/vehicle/powertrain operating conditions in which the specified component information from sensor data signals indicative of first and second component (or as otherwise specified for special cases) functionality shall be evaluated;

determining the measured values of a first and second component (or as otherwise specified for special cases) from sensor data signals indicative of first and second component functionality;

comparing said measured value condition of said first component to said measured value condition of said second component to determine whether sensor readings from said first and second components are indicative of a component operating within a normal range or indicative of a component or system failure based on an irrational measured values for some of the parametric information that has been evaluated;

logging an indication of an impending sensor or component failure as a fault in MCM memory if it occurs for a predetermined period of time; and initiating a warning alert to an operator and taking remedial actions responsive to said indication of impending component or sensor failure.

In another aspect, the method includes logging the time of fault, type of fault, number of occurrences of a fault, time of first and last fault (engine hours or time stamp) and distance traveled with said fault.

The engine components may be selected from an Diesel Particulate Filter (DPF), Diesel Oxidation Catalyst (DOC), Intake Throttle Valve (ITV), DPF system temperature or pressure and controllers within the MCM. The vehicle component may be selected from a transmission, a controller associated with the transmission, a vehicle speed sensor system and a parking brake, vehicle speed sensor, and various driver inputs including engine brake requests and DPF switches among other components.

DETAILED DESCRIPTION OF THE PREFERRED EMBODIMENT(S)

Figure 1:
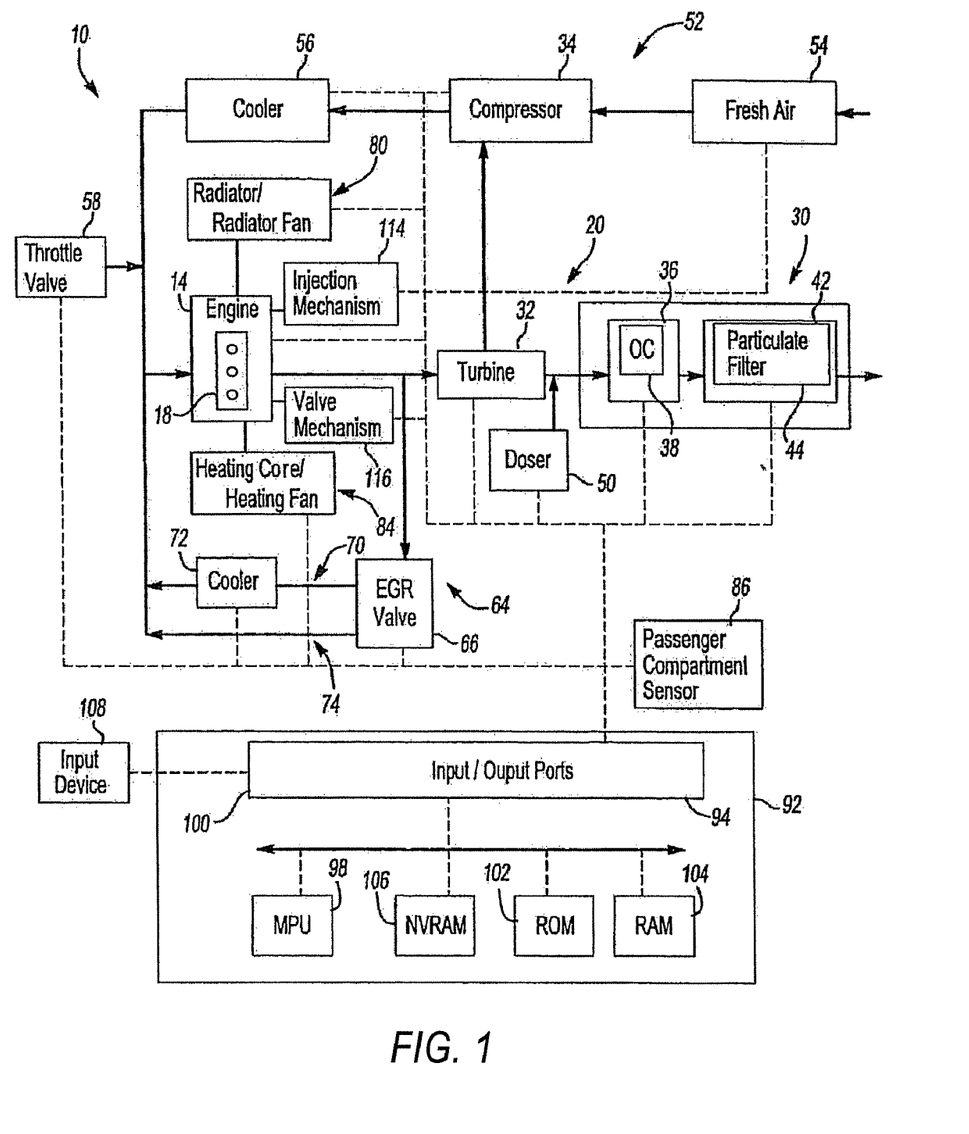
FIG. 1 is a schematic representation of a heavy duty diesel engine with an exhaust system that includes a diesel particulate filter system.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-ditty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both fresh air and EGR gases 64 to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an EGR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 through the heater valve so that the heating fan, which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or subsystems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, such as regeneration system controller, may be configured for determining a desired inlet and outlet pressure at the particulate filter to determine whether the sensor data signals from sensors related to the functionality of the diesel particulate filter system are accurate. When sensors render inaccurate readings, the functionality of the diesel particulate filter may be compromised and the operator of a vehicle should be alerted to that situation so that corrective action can be taken.

Figure 2:
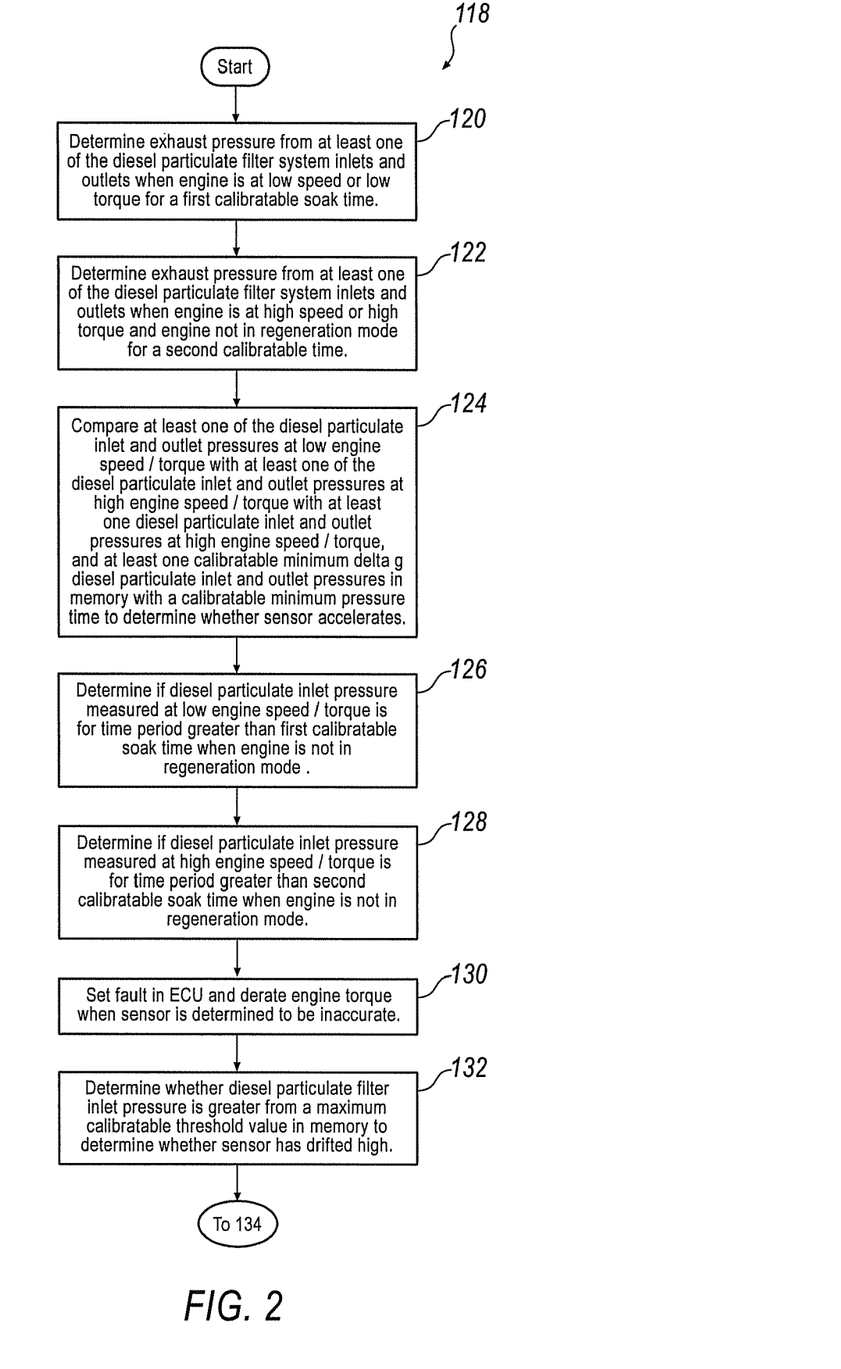
FIG. 2 is a representation of a software flow chart of one method according to the present invention.
Figure 3:
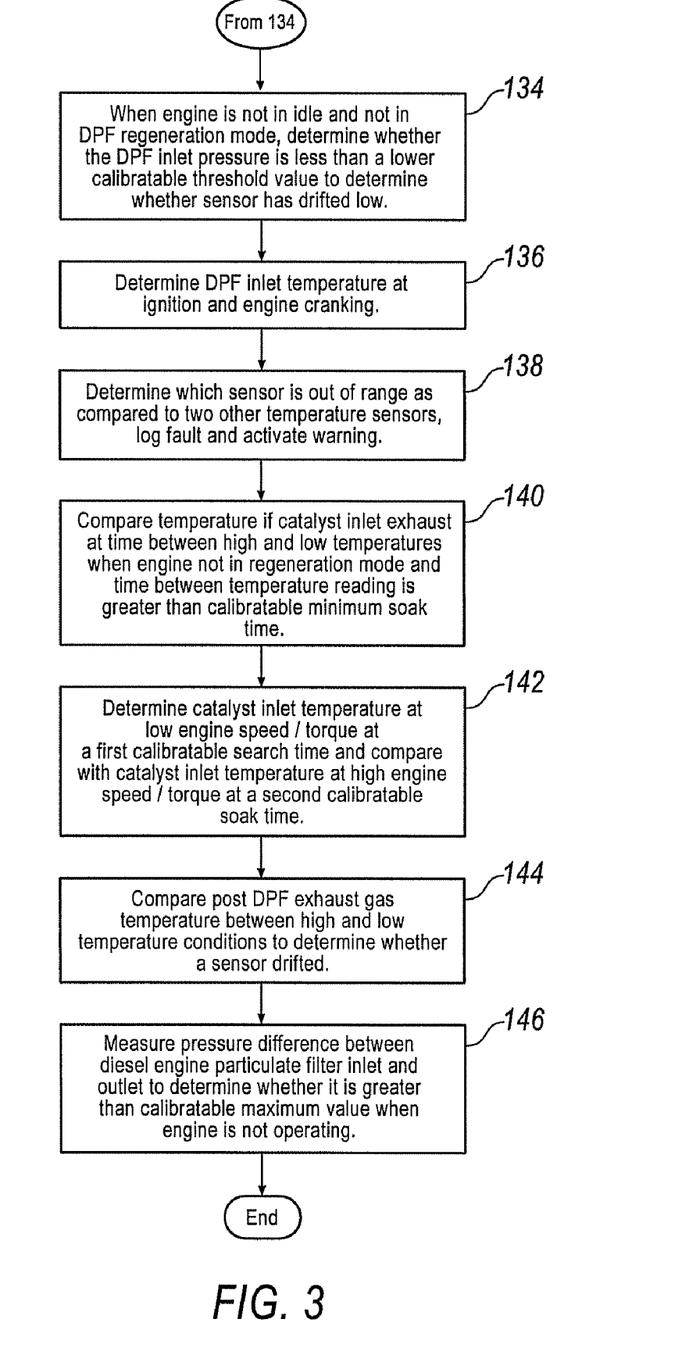
FIG. 3 is a continuation of the flow chart of FIG. 2.

FIGS. 2 and 3 depict a schematic representation of a software flowchart showing the steps of one method 118 according to the present invention. Specifically, in method 118, step 120 is determining the exhaust pressure from at least one of the diesel particulate filter system inlet and said outlet at when said engine is at least at one of low engine speed and low engine torque. Step 122 is determining the exhaust pressure from at least one of the diesel particulate inlet and said outlet when the engine is at least at one of high engine speed and high engine torque. These determinations, transmitted as data signals from sensors in the inlet and outlet portions of the diesel exhaust particulate filter system are transmitted to the ECU, where step 124 is comparing at least one of said diesel particulate inlet and outlet pressure at low engine speed and low engine torque with at least one of said diesel particulate inlet and outlet pressure at high engine speed and high engine torque with at least one of diesel particulate inlet and outlet pressure at high engine speed and at least one of calibratable minimum delta of diesel particulate inlet and outlet pressure in memory in said ECU with a calibratable minimum period of time in memory in said ECU to determine whether said sensor is accurate. It is understood that the ECU may contain one or more modules wherein there is reprogrammable memory resident therein that has tables with values relating to engine speed, engine torque, and expected inlet and outlet pressures at various engine speeds and engine torques. When it is determined that the sensor reading is outside the range of values in memory, there may be a problem with either the diesel particulate filter system or the sensors. If the engine is not in regeneration mode, and the diesel particulate outlet pressure is below a calibratable minimum threshold, the sensor has drifted low. If the engine is at high speed and high torque, and the engine not in idle mode and is not in regeneration mode, and the diesel particulate outlet pressure is above a calibratable maximum threshold, the sensor has drifted high. In any case, the operator of the vehicle should become aware of the information as it is indicative of sensor drift and the need to service the vehicle.

In step 126 when the diesel particulate inlet pressure is measured at low engine speed, low engine torque, the time period for the sensor readings is greater than a first calibratable soak time when the engine is not in regeneration mode. Moreover, in step 128, when the diesel particulate inlet pressure is measured at high engine speed high engine torque, the time period is greater than a second calibratable soak time when the engine is not in regeneration mode. In this regard, it is preferred that the first calibratable soak time and said second calibratable soak time are substantially the same.

At step 130, when a sensor is determined to be inaccurate, a fault is set in the ECU and a maximum available engine torque is reduced to a calibratable percentage of normally available maximum engine torque.

In each measurement, the ECU makes a determination whether the sensor has drifted to the high side or the low side of sensor reading accuracy. At step 132, when the engine is at idle and is not in diesel particulate filter regeneration mode; further including determining whether the diesel particulate filter inlet pressure is greater than a maximum calibratable threshold value in memory to determine whether the diesel particulate filter sensor has drifted high. At step 134, when the engine is in idle and is not in diesel particulate filter regeneration mode the ECU further determines whether the diesel particulate filter inlet pressure is less than a lower calibratable threshold value in memory to determine whether the diesel particulate filter sensor has drifted low.

At step 136, a temperature reading is taken wherein at least one said data signal is the diesel particulate filter inlet temperature taken in a time period between when said ignition is on to when said engine is cranking. Temperature data signals are dependent upon engine soak histories. This step may further include extending said time period to a calibratable time period after said engine is cranking. In addition, it is contemplated that more than one, and preferably three sensors are used to transmit temperature data signals to the ECU, and when the absolute temperature differential between any three of the data signal sensors is greater than a calibratable threshold, a fault is logged. In this regard, at Step 138 a determination is made as to which sensor is out of range as compared to the other two temperature sensors and an appropriate rationality fault is logged and an appropriate warning indicator is activated.

Step 140 comparing the temperature of a catalyst inlet exhaust are taken between high and low temperatures conditions when the engine is not in regeneration mode and the time between the high and low temperatures readings is greater than a calibratable minimum soak time. At step 142, the catalyst inlet temperature is determined at low engine speed and low engine torque at a minimum first calibratable soak time and compared with the catalyst inlet temperature at high speed and high engine torque at a minimum second calibratable soak time. In this regard, the first calibratable soak time and said second calibratable soak time are different. In addition, the catalyst inlet temperatures are logged in memory and default values are used upon each new ignition cycle.

At step 144, the post diesel particulate filter exhaust gas temperatures are compared between low and high temperature conditions to determine whether a sensor has drifted. If the temperature at low engine speed, low engine torque, subtracted from the temperature at high engine speed, high engine torque, is less than a calibratable minimum threshold, at least one temperature sensor is stuck.

Finally, at step 146, if the engine is not operating and the pressure difference between the diesel particulate inlet pressure and the diesel particulate outlet pressure is greater than a calibratable maximum threshold value, a fault is logged and a warning indicator is activated. Generally, if an engine is not operating, then one would expect that the pressure on the inlet side and the outlet side of the diesel particulate filter system to be substantially the same. However, if there is a sensor reading that indicates that it is not the case, that reading is indicative of sensor drift and a warning indicator could be activated to alert the operator of the need to serve the vehicle.

If there is a circuit fault or failed rationality check on any of the sensors used for any particular rationality check, then the rationality check shall be bypassed unless otherwise specified.

There may be a window of operation defined for each of the tests that is determined by calibration parameters, except where noted.

The window of operation may consist of a minimum engine speed threshold, a maximum engine speed threshold, a minimum torque threshold, and a maximum torque threshold. The window may also be able to be designated as minimum engine speed/torque, or maximum engine speed/torque.

There may be multiple calibratable engine speed and engine torque or engine load windows that feature calibrations for the minimum and maximum engine speed and the minimum and maximum engine torque or engine load. Any speed/load or speed/torque window may be assigned (configured) for any individual diagnostic check.

For all faults described in this invention, a specific fault code is stored and the calibrator is able to calibrate the appropriate warning alerts (i.e. enablement of appropriate lamps such as Malfunction Indicator Lamp (ML) and/or Amber Warning Lamp (AWL), and Red Stop Lamp (RSL) text displays and audio message).

For all faults described in this invention, the calibrator is able to calibrate for every fault, specific fault reactions which include, but are not limited to various levels of engine derates (speed and/or torque), engine shutdowns, and other specified fault reactions such as closure of the EGR valve, using feed-forward tables for VGT control, the disablement of DPF regeneration by inhibiting either the injection of fuel to the oxidation catalyst or inhibiting the engine throttle mode necessary to achieve exhaust temperatures required for regeneration etc will be activated for operator notice.

All diagnostics described in this invention may also have a calibratable minimum time that the monitoring conditions must all be met prior to conducting the check. This stabilization time is necessary due to both sensor response and inherent system time delays during transient operation.

All diagnostics described in this invention also include the following monitoring conditions which will not be included in the individual fault descriptions throughout the remainder of the patent. Any diagnostics may be disabled if there are any active faults for any inputs relevant to the specific diagnostic which may include inputs such as intake manifold pressure or charge air cooler outlet pressure, intake manifold temperature, coolant temperature, EGR valve position, DPF inlet pressure, DPF outlet pressure, DOC inlet temperature, DPF inlet temperature, DPF outlet temperature, intake throttle position, and DPF regeneration status.

A fault may be logged if the monitoring conditions are true for a consecutive period of time exceeding a calibration time threshold for a number of events and drive cycles determined by calibration parameters.

Rationality checks may be performed with the existing sensor values as the input, even in the event that the limp home value is set.

In the event that a rationality error is detected on a sensor, the calibrator may be provided with the option of continuing to use the input values from the sensor or using calibratible default values or functions/tables as requested.

The rationality check on the intake throttle consists of a deviation between commanded and actual throttle position. The only monitoring condition is that coolant temperature must be above a calibratable minimum threshold. A fault is indicated if the deviation between commanded and actual throttle position exceeds a maximum calibratable threshold for a period of time exceeding the calibratable fault timer and a calibratable number of occurrences is exceeded, for a calibratable number of drive cycles. The specific fault code is stored and the appropriate fault reactions and warning alerts are enabled as previously described.

The rationality check for a stuck DPF inlet pressure readings shall may be compared between low and high inlet pressure conditions. In the event that the pressure change does not exceed a calibratable minimum delta within a calibratable period of time, the sensor is determined to be stuck. The monitoring conditions for the low pressure condition are that the engine has been in a low speed, low torque or low load operating condition for at least a minimum amount of time while the engine is not in DPF regeneration mode. The monitoring conditions for the high pressure condition are that the engine has been in a high speed, high torque or high load operating condition for at least a minimum amount of time while the engine is not in DPF regeneration mode. It should be noted that the times for low and high pressure stabilization times are similar and may use the same timer. The pressures for P1 and P2 may be respectively recorded when the above conditions have been met. Initially the pressures may be populated with default values so that the initial check will have a corresponding number to be compared with. With each occurrence that the monitoring conditions are met for either DPF inlet pressure, the reading shall be used for the comparison with the other parameter and stored for the next comparison. The system may utilize default values after each ignition cycle. A fault shall be determined (sensor is stuck) if the absolute value of DPF inlet pressure 2 minus DPF inlet pressure 1 is less than a calibratable minimum threshold. The specific fault code is stored and the appropriate fault reactions and warning alerts are enabled as previously described.

When the regeneration transitions from on to off the effects of the regeneration exist for a calibratable period of time. When that time period expires, a flag may be set stating that the effects of the regeneration are complete. When complete, the DPF outlet pressure readings be compared between low and high outlet pressure conditions.

DPF outlet pressure readings shall be compared between low and high outlet pressure conditions.

In monitoring conditions for DPF outlet pressure 1 (stabilized pressure low speed/low torque conditions):
 the engine is not in regeneration mode;
 the time is greater than a calibratable minimum soak time.
In monitoring conditions for DPF outlet pressure 2 (stabilized pressure high speed/high torque conditions).
 the engine is not in regeneration mode;
 the time is greater than a calibratable minimum soak time.

The time required for DPF outlet pressure 1 and DPF outlet pressure 2 to stabilize should be the same, therefore separate timers are not required. These timer calibrations may be used for all of the DPF pressure stuck rationality checks.

The pressures for DPF outlet pressure 1 and DPF outlet pressure 2 may be respectively recorded when the conditions define above are satisfied. Initially, default values shall may be utilized to allow for the initial check. To have values to compare with, and upon each new ignition cycle the default values will again be utilized. Each time the monitoring conditions are met for either pressure, the reading may be recorded to be used for the comparison with the other parameter and stored for the next comparison should the other parameter next be updated.

In fault conditions, to determine if the sensor is stuck the following must be true:
 the absolute value of DPF outlet pressure 2 minus DPF outlet pressure 1 is less than a calibratable minimum threshold, Under idle conditions the exhaust pressure at the outlet to the particulate filter is expected to be low.

There is no speed or torque window required for this plausibility check.

In monitoring conditions, the engine is at idle and not in regeneration mode.

In fault conditions, to determine if the sensor has drifted high, the following must be true:
 DPF outlet pressure is greater than a calibratable maximum threshold.

Under idle conditions the exhaust pressure at the outlet to the particulate filter is expected to be low. This gage sensor is not designed to read a negative pressure, therefore in order to detect a drifted low; the voltage A/D counts must be monitored.

In monitoring conditions, the engine is not in regeneration mode.

In fault conditions, to determine if the sensor has drifted low, the following must be true:
 DPF outlet pressure sensor A/D counts are less than a calibratable minimum threshold. Note that the calibratable minimum threshold shall be a different (higher) value than the valued used for a signal range low check.

Under high speed and torque conditions, the exhaust pressure at the outlet from the particular filter is expected to be higher than at low speed and torque.

In monitoring conditions, the engine is not in regeneration mode.

In fault conditions, to determine if the pressure sensor has drifted low, the following must be true:
 DPF outlet pressure sensor is less than a calibratable minimum threshold.

The expectation is that the three exhaust system temperature readings will all be similar. The temperature similarity depends on the engine soak histories, and the temperatures will become more similar as the engine soaks over time to ambient conditions. This diagnostic will provide the threshold levels for temperature differences that area function of engine off time.

There is no speed or torque window required for this plausibility check.

The ignition shall be on and the engine shall not be in regeneration mode for the monitoring conditions.

The temperatures shall be measured during the period of time between ignition on and engine cranking. If that is not an adequate period of time during which to measure the temperatures, the temperatures may be measured within a calibratable period of time after the engine cranking ends.

A calibratable table shall be created to define the threshold as a function of prior engine off time. The plausibility check will not be made for shut-off times less than the minimum value in the table.

The temperatures may be measured during the period of time between ignition on and engine cranking. A determination may be made as to which sensor is out of range as compared to two other temperature sensors, and the appropriate rationality fault may be logged and the appropriate lamps shall be illuminated, when:
 In Fault conditions, the absolute temperature differential between any of the three following sensors is greater than a calibratable threshold.

Temperatures of the DPF inlet exhaust gas shall be compared between low and high temperature conditions.

In monitoring conditions for the DPF, the inlet temperature 1 (stabilized temperature low speed/low torque conditions) are:
the engine is not in regeneration mode;
the engine is greater than a calibratable minimum soak time.

In monitoring conditions for the DPF, the inlet temperature 2 (stabilized temperature high speed/high torque conditions) are:
the engine is not in regeneration mode
the time is greater than a calibratable minimum soak time;

The time required for DPF inlet temperature 1 and DPF inlet temperature 2 to stabilize may be different, therefore separate timers are required for the high and the low temperature soak conditions. These two calibrations may be used for all of the DPF temperature stuck rationality checks.

The temperatures for DPF inlet temperature 1 and DPF inlet temperature 2 may be respectively recorded when the conditions define about are satisfied. Initially, default values may be utilized to allow for the initial check to have values to compare with, and upon each new ignition cycle the default values will again be utilized. Each time the monitoring conditions are met for either temperature, the reading shall be recorded to be used for the comparison with the other parameter and stored for the next comparison should the other parameter next be updated, when:

In fault conditions, to determine if the sensor is stuck, the following must be true:
the absolute value of DPF temperature 2 minus DPF temperature 1 is less than a calibratable minimum threshold.

Temperatures of the catalyst inlet exhaust gas shall be compared between low and high temperature conditions when:

In monitoring conditions for catalyst inlet temperature 1 (stabilized temperature low speed/low torque conditions):
the engine is not in regeneration mode;
the timer is greater than a calibratable minimum soak time.
In monitoring conditions for catalyst inlet temperature 2 (stabilized temperature high speed/high torque conditions):
the engine is not in regeneration mode;
the time is greater than a calibratable minimum soak time.

The time required for catalyst inlet temperature 1 and catalyst inlet temperature 2 to stabilize may be different, therefore separate timers may be required for the high and the low temperature soak conditions. These two calibrations may be used for all of the catalyst temperature stuck rationality checks, when:

The temperatures for catalyst inlet temperature 1 and catalyst inlet temperature 2 shall be respectively recorded when the conditions define about are satisfied. Initially, default values shall be utilized to allow for the initial check to have values to compare with, and upon each new ignition cycle the default values will against be utilized. Each time the monitoring conditions are met for either temperature, the reading shall be recorded to be used for the comparison with the other parameter and stored for the next comparison should the other parameter next be updated.

To determine if the sensor is stuck, the following must be true:
the absolute value of Catalyst inlet temperature 2 minus Catalyst inlet temperature is less than a calibratable minimum threshold.

Temperatures of the post-DPF exhaust gas may be compared between low and high temperature conditions. For post-DPF temperature 1 (stabilized temperature low speed/ low torque conditions):
the engine is not in regeneration mode;
the time is greater than a calibratable minimum soak time.

For post-DPF inlet temperature 2 (stabilized temperature high speed high torque conditions):
the engine is not in regeneration mode;
the time is greater than a calibratable minimum soak time.

The time required for DPF inlet temperature 1 and DPF inlet temperature 2 to stabilize may be different, therefore separate timers are required for the high and the low temperature soak conditions. These two calibrations may be used for all of the DPF temperature stuck rationality checks when:

The temperatures for post-DPF temperature 1 and post-DPF temperature 2 shall be respectively recorded when the conditions define about are satisfied. Initially, default values shall be utilized to allow for the initial check to have values to compare with, and upon each new ignition cycle the default values will again be utilized. Each time the monitoring conditions are met for either temperature, the reading shall be recorded to be used for the comparison with the other parameter and stored for the next comparison should the other parameter next be updated.

To determine if the sensor is stuck the following must be true:
the absolute value of post-DPF temperature 2 minus post-DPF temperature 1 is less than a calibratable minimum threshold.

The words used to describe the invention are understood to be words of description, and not words of limitation. Those skilled in the art recognize that many variations and medications are possible upon a reading of the specification without departing from the scope and spirit of the invention as set forth in the appended claims.

What is claimed as new and desired to be protected by Letters Patent of the United States is:

1. A method to perform diagnostics on an electronically controlled diesel engine equipped with an electronic control unit (ECU) having memory and tables resident therein; said engine further equipped with an ignition and at least one sensor adapted to transmit data signals from a diesel particulate filter system having a catalyst with an inlet and an outlet; said method comprising:
    determining pressure from at least one of said diesel particulate inlet and said outlet when said engine is at least at one of low engine speed and low engine torque;
    determining pressure from at least one of said diesel particulate inlet and said outlet when said engine is at least at one of high engine speed and high engine torque; and
    comparing at least one of said diesel particulate inlet and outlet pressure between low engine speed and low engine torque with at least one of said diesel particulate inlet and outlet pressure at high engine speed and high engine torque and at least one of calibratable minimum delta of diesel particulate inlet and outlet pressure in memory in said ECU with a calibratable minimum period of time in memory in said ECU to determine whether said sensor is accurate.

2. The method of claim 1, wherein for diesel particulate inlet pressure at low engine speed, low engine torque, the calibratable minimum time period is greater than a first calibratable soak time when the engine is not in regeneration mode.

3. The method of claim 2, wherein for diesel particulate inlet pressure at high engine speed high engine torque, the calibratable minimum time period is greater than a second calibratable soak time when the engine is not in regeneration mode.

4. The method of claim 3, wherein said first calibratable soak time and said second calibratable soak time are substantially the same.

5. The method of claim 1, wherein when said sensor is determined to be inaccurate, a fault is set in the ECU and a maximum available engine torque is reduced to a calibratable percentage of normally available maximum engine torque.

6. The method of claim 1, wherein when said engine is at idle and is not in diesel particulate filter regeneration mode; further including determining whether the diesel particulate filter inlet pressure is greater than a maximum calibratable threshold value in memory to determine whether the diesel particulate filter sensor has drifted high.

7. The method of claim 1, wherein when said engine is in idle and is not in diesel particulate filter regeneration mode; further including determining whether the diesel particulate filter inlet pressure is less than a lower calibratable threshold value in memory to determine whether the diesel particulate filter sensor has drifted low.

8. The method of claim 1, wherein at least one said data signal is the diesel particulate filter inlet temperature taken in a time period between when said ignition is on to when said engine is cranking.

9. The method of claim 8, further including extending said time period to a calibratable time period after said engine is cranking.

10. The method of claim 8, wherein said temperature data signals depend on engine soak histories.

11. The method of claim 8, wherein an absolute temperature differential between any data signal sensor is greater than a calibratable threshold.

12. The method of claim 8, wherein a determination is made as to which sensor is out of range as compared to two other temperature sensors and an appropriate rationality fault is logged and an appropriate warning indicator is activated.

13. The method of claim 8, wherein post diesel particulate filter exhaust gas temperatures are compared between low and high temperature conditions to determine whether a sensor has drifted.

14. The method of claim 8, wherein if the temperature at low engine speed, low engine torque subtracted from the temperature at high engine speed, high engine torque is less than a calibratable minimum threshold, at least one temperature sensor is defective.

15. The method of claim 1, wherein temperature of a catalyst inlet exhaust is compared between high and low temperatures conditions and the engine is not in regeneration mode and the time is greater than a calibratable minimum soak time.

16. The method of claim 15, wherein catalyst inlet temperatures are logged in memory and default values are used upon a new ignition cycle.

17. The method of claim 15, wherein the catalyst inlet temperature is determined at low engine speed and low engine torque at a minimum first calibratable soak time and compared with the catalyst inlet temperature at high speed and high engine torque at a minimum second calibratable soak time.

18. The method of claim 17, wherein said first calibratable soak time and said second calibratable soak time are different.

19. The method of claim 1, wherein if the engine is not in regeneration mode, and the diesel particulate outlet pressure is below a calibratable minimum threshold, a determination is made that the sensor has drifted low.

20. The method of claim 1, wherein if the engine is at high speed and high torque, and said engine not in idle mode and is not in regeneration mode, and said diesel particulate outlet pressure is above a calibratable maximum threshold, a determination is made that the sensor has drifted high.

21. The method of claim 1, wherein if said engine is not operating and the difference between the diesel particulate inlet pressure and the diesel particulate outlet pressure is greater than a calibratable maximum threshold value, a fault is logged and a warning indicator is activated.

* * * * *